(12) United States Patent
Zander

(10) Patent No.: US 11,274,951 B2
(45) Date of Patent: Mar. 15, 2022

(54) FLOW METER

(71) Applicant: SIKA Dr. Siebert & Kühn GmbH & Co. KG, Kaufungen (DE)

(72) Inventor: Stefan Zander, Kassel (DE)

(73) Assignee: SIKA Dr. Siebert & Kühn GmbH & Co. KG, Kaufungen (DE)

( * ) Notice: Subject to any disclaimer, the term of this patent is extended or adjusted under 35 U.S.C. 154(b) by 266 days.

(21) Appl. No.: 16/253,302

(22) Filed: Jan. 22, 2019

(65) Prior Publication Data
US 2019/0226888 A1    Jul. 25, 2019

(30) Foreign Application Priority Data
Jan. 22, 2018   (DE) ............ 10 2018 101 278.0

(51) Int. Cl.
*G01F 1/32*   (2006.01)
*G01F 15/14*  (2006.01)

(52) U.S. Cl.
CPC .......... *G01F 1/3218* (2013.01); *G01F 1/3209* (2013.01); *G01F 15/14* (2013.01)

(58) Field of Classification Search
CPC ......... G01F 1/32; G01F 1/3209; G01F 1/3218
See application file for complete search history.

(56) References Cited

U.S. PATENT DOCUMENTS

| | | | | |
|---|---|---|---|---|
| 4,297,898 A * | 11/1981 | Herzl | ............ | G01F 1/32 73/861.22 |
| 5,363,705 A * | 11/1994 | Nakao | ............ | G01F 1/3218 73/861.22 |
| 5,808,209 A * | 9/1998 | Zielinska | ............ | G01F 1/3209 73/861.22 |
| 7,600,436 B2 * | 10/2009 | Hoecker | ............ | G01F 1/3209 73/861.22 |

FOREIGN PATENT DOCUMENTS

| | | | | |
|---|---|---|---|---|
| DE | 2517533 A1 | 11/1975 | | |
| DE | 112010003671 T5 | 3/2013 | | |
| DE | 19882239 B3 | 3/2015 | | |
| JP | 02138825 A * | 5/1990 | ............ | G01F 1/3263 |
| WO | 2015013416 A1 | 1/2015 | | |

* cited by examiner

*Primary Examiner* — Erika J Villaluna
(74) *Attorney, Agent, or Firm* — Dinsmore & Shohl LLP

(57) ABSTRACT

A flow meter for measuring the flow rate of a fluid, with a measuring tube that forms a measurement chamber through which the fluid can flow and with at least one bluff body that is disposed in the measurement chamber and wherein, additionally, a measuring body, which can be displaced due to the formation of vortices at the bluff body, is disposed downstream of the bluff body in the measurement chamber. The flow meter has at least one protrusion protruding into the measurement chamber and is formed upstream of the bluff body at an inner wall delimiting the measurement chamber.

15 Claims, 2 Drawing Sheets

FLOW METER

REFERENCE TO RELATED APPLICATION

This application claims priority of German Patent Application DE 10 2018 101 278.0, filed Jan. 22, 2018, the entire content of which is incorporated herein by reference.

FIELD OF THE INVENTION

The invention relates to a flow meter for measuring the flow rate of a fluid, with a measuring tube, which forms a measurement chamber through which the fluid can flow and with at least one bluff body that is disposed in the measurement chamber and wherein, additionally, a measuring body, which can be deflected due to the formation of vortices, is disposed downstream of the bluff body in the measurement chamber.

BACKGROUND OF THE INVENTION

DE 198 82 239 B3, for example, discloses a flow meter for measuring the flow rate of a fluid, with a measuring tube, which forms a measurement chamber through which the fluid can flow and with at least one bluff body that is disposed in the measurement chamber and wherein, additionally, a measuring body, which can be deflected due to the formation of vortices, is disposed downstream of the bluff body in the measurement chamber, such a bluff body with the function described above being also referred to as an obstruction. Such flow meters are based on the principle that vortices are formed at the bluff body, which have a separation frequency that increases proportionally with the flow rate. The periodical vortex separation occurring at the bluff body can be measured with the measuring body, for example using a piezo-element. In the process, the principle of the Karman vortex street is used for determining the flow rate of the fluid as a primary measured value based on the separation frequency of the forming vortices. The formation of the vortex street, as well as the strength of the vortices generally depend on the Reynolds number and thus also on the flow rate. As the flow rate decreases, the manifestation of vortices becomes increasingly weaker, so that the voltage signal that can be generated by the piezo-elements also become weaker. The analysis of very weak voltage signals is thus made significantly more difficult as a result of low flow rates.

Known possibilities for amplifying voltage signals consist in increasing the sensitivity of the measuring body. An appropriate construction and a corresponding choice of materials can improve the transfer of a bending moment, for example onto the piezoceramic, so that the tensions that can be generated in the piezo-element are increased. An electronic amplification of pressure sensors is also known, wherein interference signals are however also disadvantageously amplified.

SUMMARY OF THE INVENTION

The problem underlying the invention is to further improve a flow meter for measuring the flow rate of a fluid, which is suited for measuring even low flow rates with simple means, by providing easily analyzable measurement signals even at low flow rates.

This problem is solved based on a flow meter according to the preamble of claim 1 in conjunction with the characterizing features. Advantageous developments of the invention are specified in the dependent claims.

The invention includes the technical teaching according to which at least one protrusion extending into the measurement chamber is formed, upstream of the bluff body, on an inner wall delimiting the measurement chamber.

At the core of the invention lies a vortex amplification that can be used even with low flow rates of the fluid inside the measuring tube. One can assume that this effect is caused by the fact that the arrangement of at least one protrusion upstream of the bluff body leads to the formation of turbulences at the protrusion and that the turbulences formed at the protrusion separate from the protrusion and can amplify the vortices, generated at the bluff body, of a forming Karman vortex street. This results in a stronger load being exerted on the measuring body by the stronger vortices periodically separating from the bluff body.

The bluff body particularly advantageously extends transversely to the longitudinal axis, for example in a vertical axis, through the measurement chamber, wherein the at least one protrusion is disposed at the inner wall in a position that is rotated around the longitudinal axis relative to the vertical axis. The rotation can have an angle of, for example, 60° to 90°, preferably 80° to 90° and particularly preferably 90°, so that the protrusion is particularly preferably disposed directly transversely to the vertical axis.

A particularly good amplification effect is obtained when two protrusions are disposed at the inner wall in mutually opposite positions. If the bluff body extends vertically through the circular cross-section of the measurement chamber, the protrusions are located laterally in the measuring tube in a lateral arrangement. In this respect, the protrusions are preferably disposed diametrically opposite each other and the periodical formation of vortices at the bluff body is amplified, in equal measure, in both lateral directions, by the formation of greater vortices caused by the formation of pre-vortices at the protrusions.

A significant advantage of inducing a vortex amplification by means of the protrusions at the inner wall of the measuring tube is that the protrusions can be small and generate only a weak additional flow resistance, in particular because the flow rate of the fluid in the vicinity of the inner wall of the measurement chamber is already significantly lower than in the middle of the measurement chamber, for example. Thus, the flow rates of the fluid flowing against the protrusions are significantly lower than a nominal flow rate of the fluid.

As a rule, the measurement chamber has a cylindrical basic shape, which extends in a rotationally symmetrical manner around the longitudinal axis, wherein the protrusion or protrusions more specifically have a flow edge, which extends parallel to the vertical axis and thus parallel to the longitudinal direction of extension of the bluff body. When the fluid flows against the protrusions, still water areas are formed on the rear side of the flow edges, which lead to the formation of turbulences in the fluid, wherein the formed turbulences can significantly amplify the vortices at the bluff body. This amplification has a stronger impact on the measuring body, which results in a stronger signal strength of the measurement signal.

The flow edge between two surfaces of the protrusion is formed, for example, in such a manner that a sharp edge is formed, for example, by forming the flow edge from two surfaces, which are disposed at a right angle or an even more acute angle relative to each other. The front side of the protrusion can thus form an inclined plane surface, or the plane surface can have a curvature, which ultimately ends in the flow edge. On the rear side of the protrusion, i.e. the side delimiting the still water area, the protrusions preferably have a plane surface.

The length of the flow edge can, for example, amount to 15% to 80%, preferably 25% to 50%, and particularly preferably to 35% of the diameter of the measurement chamber, which has a cross-section shaped more specifically as a circular cylinder. The diameter of the cylindrical basic shape of the measurement chamber can, for example, have a value of 8 mm to 30 mm, preferably 10 mm to 20 mm, particularly preferably 12 mm to 14 mm and most preferably 13 mm, wherein the length of the flow edge has a value of 2 mm to 10 mm, preferably 3 mm to 6 mm, and particularly preferably 4.5 mm. In this respect, the 4.5 mm length of the flow edge corresponds to the 13 mm diameter of the measurement chamber in such a manner, that a bigger or smaller measurement chamber can also result in a correspondingly bigger or smaller flow edge, which can be preferably correspondingly formed. According to a possible exemplary embodiment, the height of the protrusion in a direction leading radially toward the longitudinal axis, starting at the inner wall of the measurement chamber, can amount to for example 2% to 30%, preferably 10% to 20% and particularly preferably 13% to 17% of the diameter of the measurement chamber. For example, the value of the height of the protrusion can thus be 1 mm to 3 mm, preferably 1.5 mm to 2.5 mm and particularly preferably 2 mm, when the diameter of the measurement chamber is 15 mm.

In this respect, the flow edge forms the outer end of the protrusion with which it extends into the inner space, so that, starting at the inner wall, the flow edge forms the upper end of the protrusion.

In order to manufacture the protrusion, it can be provided that it is formed in one piece and/or from the same material as the measuring tube. It is also possible to provide a separate screen element that is disposed upstream before the measuring tube and wherein the screen element comprises a passage corresponding with the diameter of the measurement chamber and wherein the at least one protrusion is formed at the screen element. For example, when the measuring tube is integrated into a fluid line, the screen element can be placed in front of the measuring tube.

BRIEF DESCRIPTION OF THE DRAWINGS

In the following, additional arrangements improving the invention are shown in more detail in conjunction with the description of a preferred exemplary embodiment of the invention, based on the drawings.

DETAILED DESCRIPTION OF THE INVENTION

Figure 1:
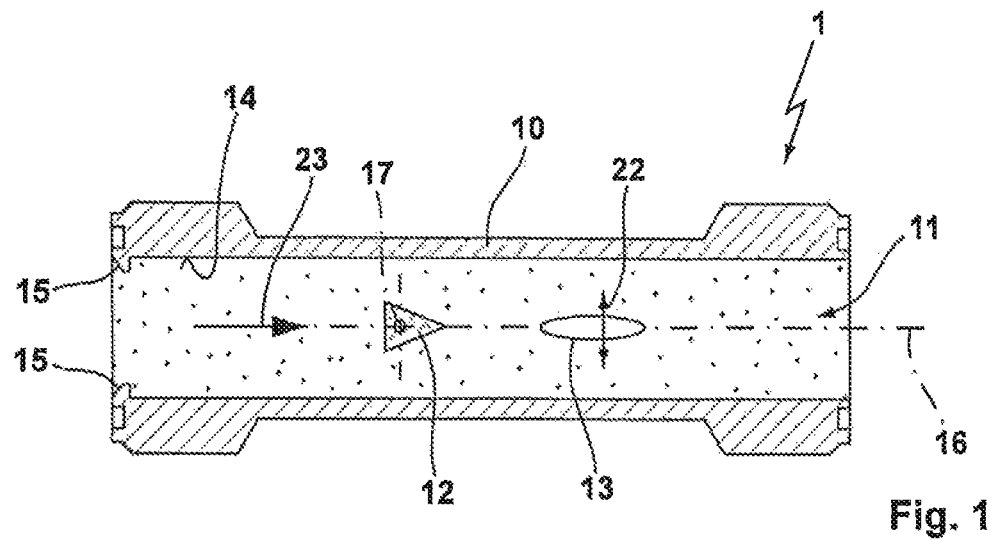
FIG. 1 shows a view of a flow meter with a measuring tube, in which a measurement chamber is formed and two oppositely arranged protrusions are located on the inner wall of the measurement chamber upstream of a bluff body.

FIG. 1 shows a crosscut lateral view of a flow meter 1 with a measuring tube 10 for measuring the flow rate of a fluid that can flow through the measuring tube 10 in a flow direction 23. To this end, the measuring tube comprises a measurement chamber 11, which extends along a longitudinal axis 16 and comprises, for example, a circular flow cross-section. A bluff body 12, which extends along a vertical axis 17 is disposed inside the measurement chamber 11, wherein the vertical axis 17 is formed along the diameter of the measurement chamber, and the vertical axis 17 thus extends transversely to the longitudinal axis 16 and is thus vertical relative to the image plane.

The flow through the measurement chamber 11 occurs in a flow direction 23 indicated by an arrow, and a measuring body 13 is located downstream of the bluff body 12. Due to the fluid flowing against the bluff body 12, periodically separating vortices are formed thereon, which lead to a displacement of the measuring body 13 in a displacement direction 22. This displacement of the measuring body 13 also occurs periodically, so that a measurement signal can be derived, in particular by using piezo-elements in conjunction with the measuring body 13. In this regard, the measuring body 13 does not have to extend along the entire diameter of the measurement chamber 11 and it can be sufficient, if the measuring body 13 merely extends into the measurement chamber 11 in the manner like a fin.

Two protrusions 15 are located upstream of the bluff body 12 at the inner wall 14 of the measurement chamber 11 in a lateral arrangement relative to the bluff body 12. The protrusions 15 are arranged opposite each other at the inner wall 14, wherein, according to the shown exemplary embodiment, the diametral direction of the arrangement of the protrusions 15 is rotated by 90° relative to the vertical axis 17 along which the bluff body 12 extends.

When the fluid flows through the measurement chamber 11, turbulences are formed at or directly behind the protrusions 15, which influence the vortices at the flow body 12 and/or can, for example, join with the vortices at the flow body 12 and thus amplify them. This results in an amplification of the formation of vortices at the bluff body 12, so that the displacement of the measuring body 13 in the displacement direction 22 indicated by the arrows can also be amplified. This allows generating a stronger measurement signal, so that improved measurements of the flows of the fluid even at very low flow rates can be taken by the measuring tube 10.

Figure 2:
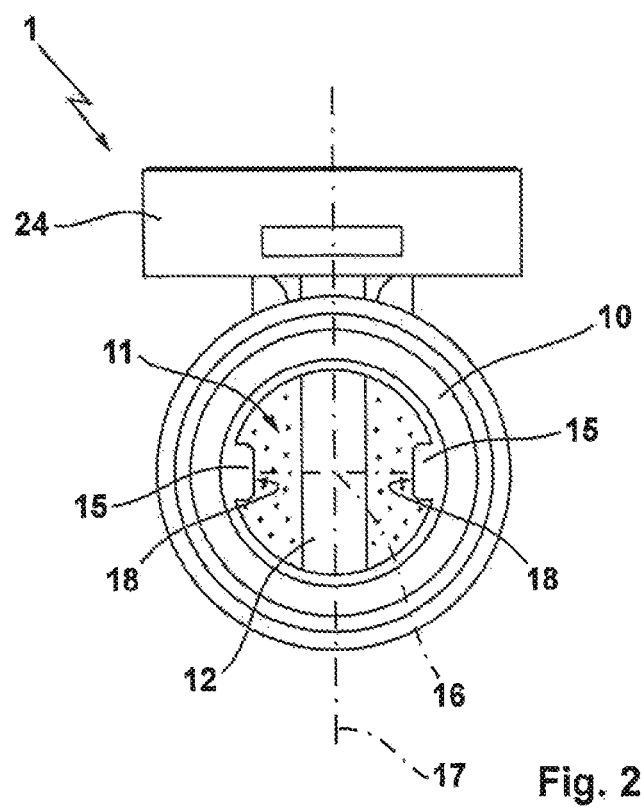
FIG. 2 shows a top view of the flow meter, seen from the direction of the longitudinal axis.

FIG. 2 shows a view of the flow meter 1 seen from the longitudinal axis 16 and the vertical axis 17 extends vertically, as does the bluff body 12. The protrusions 15, which have a flow edge 18 on their front side, are located laterally from the bluff body 12. In this regard, the flow edge 18 extends, at least in sections, parallel to the vertical axis 17 and thus parallel to the bluff body 12. A measurement connection unit 24 is located above the measuring tube 10 and, when a fluid flows through the measurement chamber 11, a displacement of the covered measuring body takes place, which can be measured using a suitable measuring element, and an analysis as well as a suitable connection, for example with a peripheral analysis unit, can be carried out by way of the measurement connection unit 24.

Figure 3:
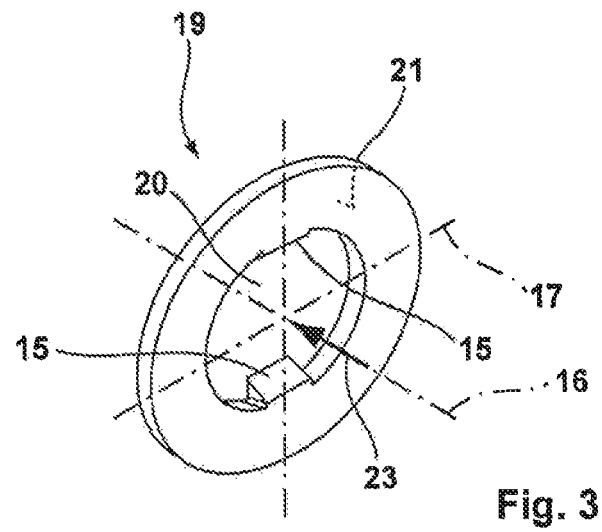
FIG. 3 shows a perspective view of a screen element, at which two protrusions are formed.

FIG. 3 shows a perspective view of a screen element 19, on which the protrusions 15 are formed. The screen element 19 comprises a passage 20, so that it can be traversed by a flow in the direction of the longitudinal axis 16. Such a screen element 19 can be disposed with a plane surface 21 at the aperture or the front surface of a measuring tube 10 according to FIG. 1. The orientation of the vertical axis 17 is also shown in this view, so as to further illustrate the fact that the protrusions 15 are arranged transversely to the vertical axis 17. The diameter of the passage 20 can also correspond to the diameter of the measurement chamber 11.

Figure 4:
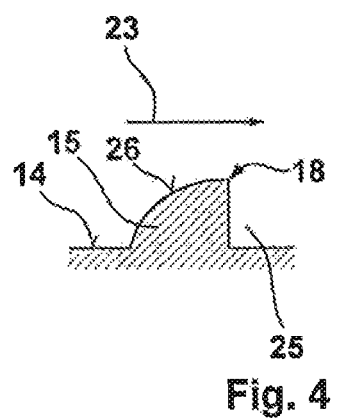
FIG. 4 shows a first possible exemplary embodiment for designing a protrusion.

FIG. 4 shows a possible first exemplary embodiment for forming a protrusion 15 with a flow edge 18. In the flow direction 23, the protrusion 15 comprises a curved incident flow surface 26 on the front side, which ends in the flow edge 19, and a still water area 25 is formed behind the flow edge 18, in which the desired vortices form. In this regard, the representation of the protrusion 15 is arranged at the inner wall 14 of the measuring tube.

Figure 5:
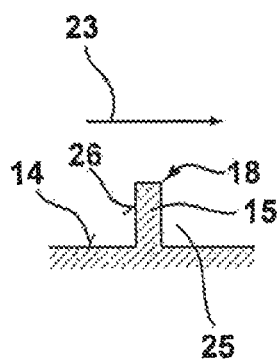
FIG. 5 shows a second possible exemplary embodiment for designing a protrusion and FIG. 6 shows another possible exemplary embodiment for designing a protrusion.

FIG. 5 shows another embodiment of a protrusion 15 arranged at the inner wall 14 with a flow edge 18, wherein the protrusion 15 comprises plane surfaces both in and contrary to the flow direction 23, so that the incident flow surface 26 is also planar and the still water area 25 is also delimited by a plane surface.

Figure 6:
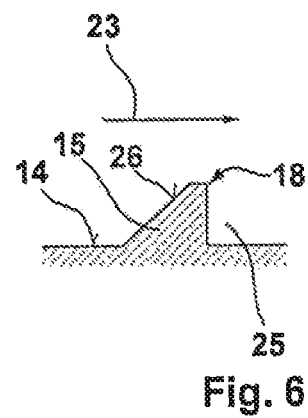

Finally, FIG. 6 shows the configuration of a protrusion 15 arranged at the inner wall 14 with a ramp-shaped incident flow surface 26 formed contrary to the flow direction 23, which ultimately also ends in the flow edge 18 on the front side, wherein the still water area 25 is in turn delimited in front of a plane surface of the protrusion 15.

The inner walls 14 shown herein can also be formed by the inner edge of the passage 20 of the screen element 19 according to FIG. 3.

With all the non-exhaustively enumerated configurations of protrusions 15 represented herein, still water areas 25 are respectively formed, in which turbulences are generated, which can be separated from the protrusions 15 starting at a certain flow rate and the turbulences are led to the bluff body 12 by the flow of the fluid. The resulting amplification of the main vortices, which are formed at the bluff body 12 and act on the measuring body 13, leads to an improved measurability of the vortex frequency at the measuring body 13.

The implementation of the invention is not limited to the preferred exemplary embodiment indicated above. Rather, a number of alternatives are conceivable, which also make use of the shown solution in fundamentally different embodiments. All the features and/or advantages, including design details or spatial arrangements, arising from the claims, the description or the drawings can be essential to the invention both separately and in various combinations of each other.

LIST OF REFERENCE NUMBERS

1 Flow meter
10 Measuring tube
11 Measurement chamber
12 Bluff body
13 Measuring body
14 Inner wall
15 Protrusion
16 Longitudinal axis
17 Vertical axis
18 Flow edge
19 Screen element
20 Passage
21 Plane surface
22 Displacement direction
23 Flow direction
24 Measurement connection unit
25 Still water area
26 Incident flow surface

The invention claimed is:

1. A flow meter for measuring the flow rate of a fluid, comprising:
a measuring tube forming a measurement chamber through which a fluid can flow; at least one bluff body disposed in the measurement chamber;
a measuring body disposed downstream of the at least one bluff body in the measurement chamber, the measuring body configured to be deflected due to the formation of vortices at the at least one bluff body;
at least one protrusion extending from an inner wall of the measuring tube, protruding into the measurement chamber, and terminating at a flow edge which forms an outer end of the protrusion, the at least one protrusion formed upstream of the at least one bluff body; and
a still water area formed on the rear side downstream of the flow edge in such a way that the periodical formation of vortices at the bluff body is amplified by the formation of pre-vortices at the at least one protrusion.

2. The flow meter according to claim 1, wherein the at least one bluff body extends transversely to a longitudinal axis of the measurement chamber along a vertical axis through the measurement chamber, and/or the at least one protrusion is disposed at the inner wall in a position that is rotated around the longitudinal axis by 60° to 90°, or by 80° to 90°, or by 90° relative to the vertical axis.

3. The flow meter according to claim 2, wherein the measurement chamber has a cylindrical shape that extends around the longitudinal axis, and/or the at least one protrusion comprises a flow edge that extends parallel to the vertical axis and/or parallel to a longitudinal direction of extension of the at least one bluff body.

4. The flow meter according to claim 3, wherein the at least one protrusion further has two surfaces that are disposed at least adjacently to the flow edge at a right angle relative to each other and the flow edge is formed between the two surfaces of the at least one protrusion.

5. The flow meter according to claim 3, wherein a length of the flow edge is 15% to 80%, or 25% to 50%, or 35% of a diameter of the cylindrical measurement chamber.

6. The flow meter according to claim 3, wherein the flow edge forms an upper end of the at least one protrusion and the upper end is spaced from the inner wall.

7. The flow meter according to claim 2, wherein the at least one protrusion has a height starting from the inner wall of the measurement chamber in a direction extending radially toward the longitudinal axis, and the height is 2% to 30%, 10% to 20%, and/or 13% to 17% of a diameter of the measurement chamber.

8. The flow meter according to claim 1, wherein the at least one protrusion comprises two protrusions disposed in mutually opposite positions at the inner wall of the measurement tube.

9. The flow meter according to claim 1, wherein the at least one protrusion is formed in one piece with and/or from the same material as the measuring tube.

10. The flow meter according to claim 1, further comprising:
a screen element disposed upstream in front of the measuring tube; and
the screen element comprising a passage corresponding to a diameter of the measurement chamber and the at least one protrusion formed at the screen element.

11. A flow meter for measuring the flow rate of a fluid, comprising:
a measuring tube forming a measurement chamber through which a fluid can flow; at least one bluff body disposed in the measurement chamber;
a measuring body disposed downstream of the at least one bluff body in the measurement chamber, the measuring body configured to be deflected due to the formation of vortices at the at least one bluff body; and at least one protrusion protruding into the measurement chamber formed upstream of the at least one bluff body at an inner wall of the measuring tube delimiting the measurement chamber; wherein the at least one protrusion comprises two protrusions disposed in mutually opposite positions at the inner wall of the measurement tube.

12. A flow meter for measuring the flow rate of a fluid, comprising:

a measuring tube forming a measurement chamber through which a fluid can flow; at least one bluff body disposed in the measurement chamber;

a measuring body disposed downstream of the at least one bluff body in the measurement chamber, the measuring body configured to be deflected due to the formation of vortices at the at least one bluff body; and at least one protrusion protruding into the measurement chamber formed upstream of the at least one bluff body at an inner wall of the measuring tube delimiting the measurement chamber;

wherein the at least one bluff body extends transversely to a longitudinal axis of the measurement chamber along a vertical axis through the measurement chamber, and/or the at least one protrusion is disposed at the inner wall in a position that is rotated around the longitudinal axis by 60° to 90°, or by 80° to 90°, or by 90° relative to the vertical axis; wherein the measurement chamber has a cylindrical shape that extends around the longitudinal axis, and/or the at least one protrusion comprises a flow edge that extends parallel to the vertical axis and/or parallel to a longitudinal direction of extension of the at least one bluff body.

13. The flow meter according to claim 12, wherein the at least one protrusion further has two surfaces that are disposed at least adjacently to the flow edge at a right angle relative to each other and the flow edge is formed between the two surfaces of the at least one protrusion.

14. The flow meter according to claim 12, wherein a length of the flow edge is 15% to 80%, or 25% to 50%, or 35% of a diameter of the cylindrical measurement chamber.

15. The flow meter according to claim 12, wherein the flow edge forms an upper end of the at least one protrusion and the upper end is spaced from the inner wall.

\* \* \* \* \*